United States Patent [19]

Hartwick

[11] 4,170,458

[45] Oct. 9, 1979

[54] SMOKE ELIMINATOR METHOD AND APPARATUS

[76] Inventor: George J. Hartwick, 3733 N. Sheridan Rd., Waukegan, Ill. 60085

[21] Appl. No.: 845,046

[22] Filed: Oct. 25, 1977

[51] Int. Cl.² ............................................. B01D 47/06
[52] U.S. Cl. ............................................. 55/85; 55/89; 55/90; 55/94; 55/228; 55/257 R; 261/DIG. 75
[58] Field of Search ................... 55/85, 89, 90, 23, 94, 55/220, 223, 226, 228, 257 R, 84; 261/DIG. 75, DIG. 54

[56] References Cited

U.S. PATENT DOCUMENTS

| | | | |
|---|---|---|---|
| 1,533,859 | 4/1925 | Hodge | 55/228 |
| 2,142,406 | 1/1939 | Nonhebel et al. | 55/228 |
| 2,947,379 | 8/1960 | Aubrey | 55/89 |
| 3,286,442 | 11/1966 | Wylegala | 55/89 |
| 3,371,618 | 3/1968 | Chambers | 261/DIG. 75 |
| 3,456,928 | 7/1969 | Selway | 261/DIG. 54 |
| 3,733,788 | 5/1973 | Crowley | 55/228 |
| 3,773,472 | 11/1973 | Hausberg et al. | 261/DIG. 54 |
| 3,820,307 | 6/1974 | Hausberg et al. | 55/226 |
| 4,013,455 | 3/1977 | Kleeberg et al. | 55/226 |

FOREIGN PATENT DOCUMENTS 156271  7/1932  Switzerland .................. 55/223

Primary Examiner—David L. Lacey
Attorney, Agent, or Firm—Hill, Van Santen, Steadman, Chiara & Simpson

[57] ABSTRACT

A method and apparatus for the treatment of gaseous and particulate material in combustion products and similar fluid discharges, in which the discharge is first subjected to a water spray, any excess water remaining thereafter separated therefrom, the washed discharge placed under a pressure of from approximately 20 to 40 psi, and the pressurized discharge intimately intermixed with water under pressure and subsequently separated therefrom, the treated discharge exhausted and particulates and dissolved materials in the water preferably removed therefrom and the water reused in the washing and intermixing operations.

16 Claims, 5 Drawing Figures

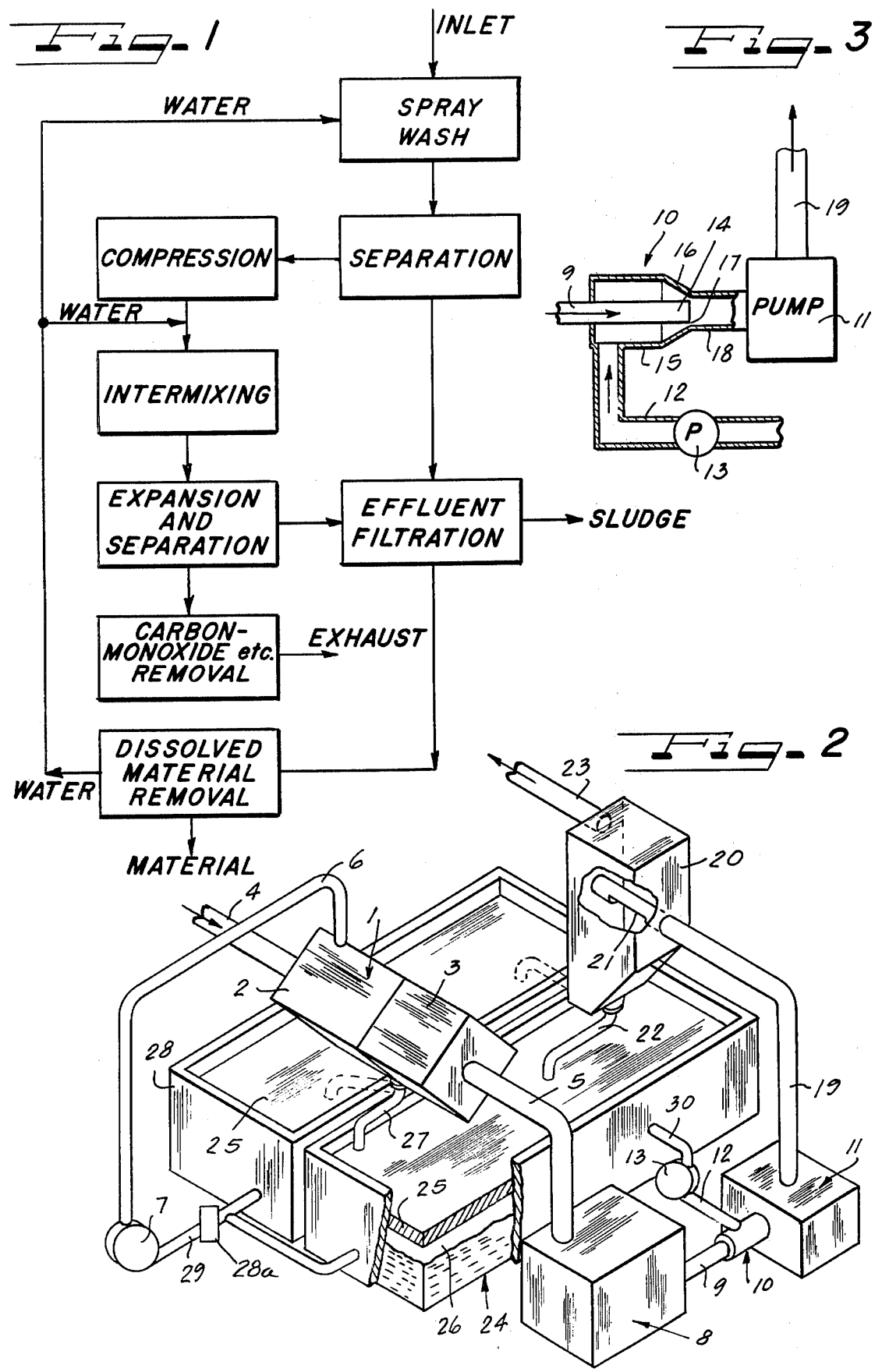

SMOKE ELIMINATOR METHOD AND APPARATUS

BACKGROUND OF THE INVENTION

The invention relates to the treatment of gases and particulates in combustion products, i.e. smoke of combustion, and similar fluid discharges.

For many years the problem of smoke pollution has been under study and various concepts have evolved with respect thereto, for example scrubbers or washers, electrostatic devices and the like. The problem of smoke exhaust from coal burning devices has been of particular concern, especially where high sulphur-content coal is being burned.

While washers or scrubbers and electrostatic devices, etc. are relatively effective with respect to particulate matter, the removal of high concentrations of sulphur products, particularly sulphur dioxide have continued to remain a problem.

BRIEF SUMMARY OF THE INVENTION

The present invention is directed to a method and apparatus for the elimination of particulate and gaseous pollutants in fluid discharge, for example such as results from the action of combustion. The invention proceeds from the concept that for effective separation of the undesired materials from the smoke or other fluid discharge, a thorough and intimate intermixing of the fluid discharge with water is necessary to effect an efficient absorption or transfer of pollutants to the water. I have found that a very efficient action can be achieved where the fluid discharge and the water are thoroughly intermixed under pressure, preferably in a jet action. Prior to this action, the fluid discharge is passed through a spray washer and separator structure which removes a very large part of entrained particulate materials as well as the probable removal of a part of water soluble pollutants. Preferably, a washing and separating device such as illustrated in my copending application Ser. No. 581,531, filed on May 28, 1975, now U.S. Pat. No. 4,061,478 may be advantageously utilized for this operation.

Following the initial washing and separation steps the fluid discharge therefrom is supplied to positive displacement compression means, with the exhaust therefrom being at a pressure of from approximately 20-40 psi. Such discharge under pressure is then intermixed with water under pressure, preferably at substantially the same pressure as the fluid discharge, and an intermixture effected therebetween.

While it may be possible to supply such water and fluid discharge to a suitable static pressure chamber, from which the intermixture is conducted to a separator structure, it would appear preferable to supply the fluid discharge and water to a pump structure, preferably a vane type pump which mechanically further intensifies the intermixture of water and fluid discharge, from which the intermixture may be supplied to the separating means.

The separating means may, for example, be in the form of an expansion chamber into which the intermixture is conducted and in which the compressed gases may expand, with associated water being removed therefrom.

The exhaust gases from the expansion and separator means may then be suitably exhausted and in the event an undesirable excess of any undesired materials are present, such exhaust may be subjected to a further treatment for removal of such materials, utilizing known types of removal methods and structures, the details of which form no part of the present invention. Preferably, the water discharge from the initial washing and separating steps, as well as the water separated from the final separating step, may be subjected to a suitable filtration treatment for the removal of particulates therefrom, and the resulting effluent subjected to suitable treatment for the removal of dissolved materials, as for example sulphur, etc. Again such removal may be effected by known means, the details of which form no part of the present invention. With such treatment of the recovered water, the latter may be reused in the various washing and intermixing operations. Details of the filter structures likewise form no part of the present invention, and any suitable type of filter could be employed, which may, for example, be of the continuous belt or web type, or could employ a multiple construction in which the filters may be alternately employed and cleaned.

BRIEF DESCRIPTION OF THE DRAWINGS

In the drawings, wherein like reference characters indicate like or corresponding parts:

FIG. 1 is a flow diagram illustrating the operations involved in the novel method of the invention;

FIG. 2 is a semi-schematic perspective view illustrating, primarily in block form, the various components that may be utilized in the practice of the present invention;

FIG. 3 is a sectional view through the intermixing structure or jet, illustrating the same in greater detail;

DETAILED DESCRIPTION OF THE INVENTION

Figure 4:
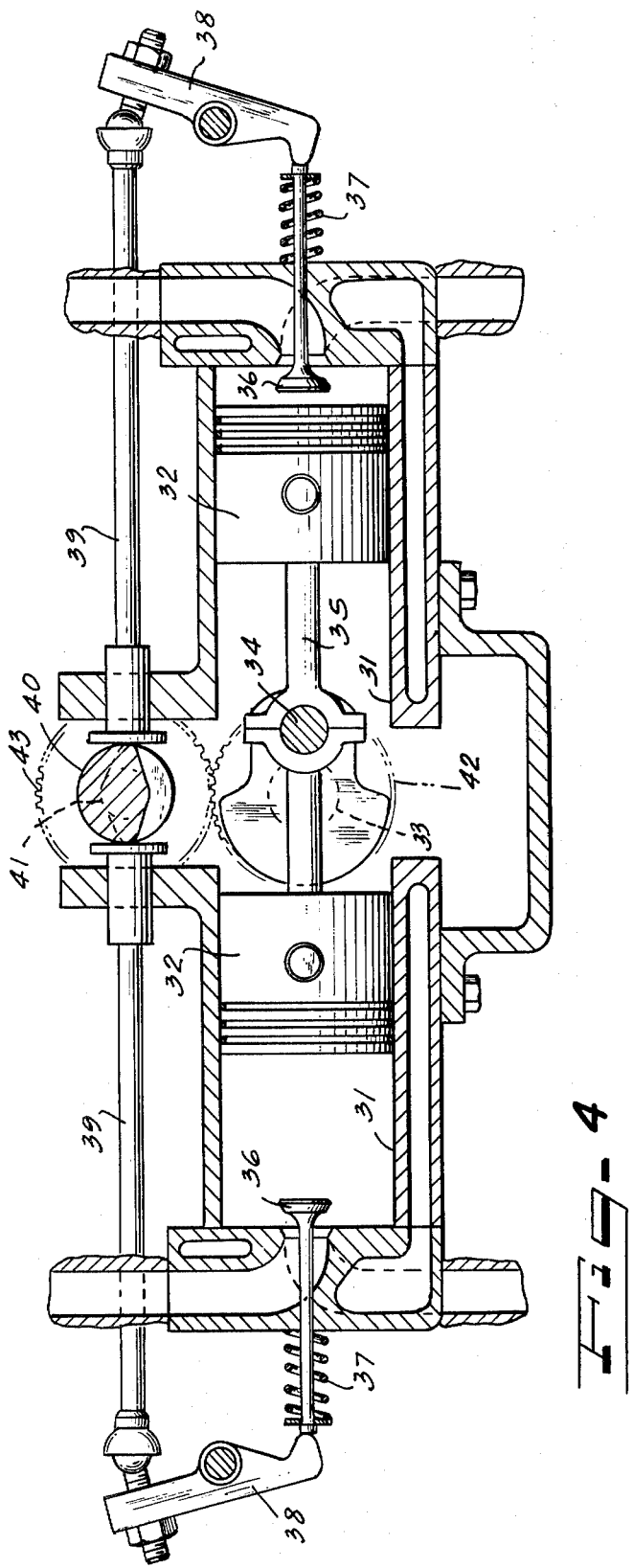
FIG. 4 is a section through a portion of the means for placing the fluid discharge under pressure.

The present invention is directed both to the method of achieving the desired results and to apparatus for the practice of the method. The apparatus is illustrated in semi-schematic form, merely for the purposes of illustration and the specific apparatus that would normally be employed will depend, as to exact form and construction, on the nature of the smoke or other fluid discharge involved, the specific combustion and/or other products involved, the size of the installation, as well as the particular materials to be removed from the water employed in the operation.

The Method

FIG. 1 illustrates a flow diagram in conjunction with which the method of the invention will be described. Briefly, the present invention contemplates the initial removal of particulate matter, etc. by more or less conventional means, followed by a pressure intermixture of water and the fluid discharge and subsequent separation therebetween.

Thus, as illustrated in FIG. 1, the smoke or other fluid discharge is initially subjected to a spray wash, i.e. subjected to an intensive spray with water, operative to remove a very large part of entrained particles as well as an adsorption of possibly a part of any water soluble materials. Following the spray operation, the fluid discharge is subjected to a separating action adapted to remove practically all of any entrained water and particulate matter, etc. from the fluid discharge which is then suitably placed under pressure. It would appear from studies and experimentation that a pressure of between approximately 20 to 40 psi is suitable, with a pressure of 30 psi providing excellent results.

The pressurized fluid discharge is then brought into intimate contact with water, likewise under pressure, and a thorough and intimate intermixing therebetween takes place. Preferably, the water will be intermixed at a pressure corresponding to that of the fluid discharge, i.e. from approximately 20 to 40 lbs. psi. It would appear that the best results are obtained when the water and fluid discharge pressure are substantially equal. The mixture may then be permitted to expand from its compressed state and the water separated from the fluid discharged, with the treated discharge being exhausted externally. Where the discharge contains other contaminants that by their nature are not adequately removed in the described process, suitable removal means and techniques may be employed to provide a suitably uncontaminated exhaust.

The water employed in the spray wash and initial separation operations as well as that removed in the expansion and separation operation may be subjected to a suitable filtration or other operation for removing particulate and/or dissolved materials from the water, thus reconditioning the water for reuse in the various operations. The sludge obtained from the filtration operation and those derived from the removal of dissolved materials may have inherent value and thus provide some financial return from the operation.

The General Apparatus

FIG. 2 illustrates, in semi-schematic form, a system for practicing the present invention, in which the respective components are generally illustrated in block form and, with the exception of those elements specifically discussed, the general construction of the various components may be in accordance with accepted practice.

The reference numeral 1 indicates generally a spray washer and separator structure having a spray section 2 and a separation section 3 with the fluid discharge entering through the conduit 4 and being exhausted through the outlet conduit 5. The structure 1 may be of any suitable form but I have found that my prior spray washer and separator, illustrated in the previously referred to U.S. Pat. application, Ser. No. 581,531, is particularly efficient for the desired purposes. As such device is illustrated and described in such patent, to which reference is here made, no need is seen to describe the same in the present application. Water for the wash operation is illustrated as being supplied through a pipe 6 from a suitable source, as hereinafter described, and placed under pressure by means of a pump 7.

Figure 5:
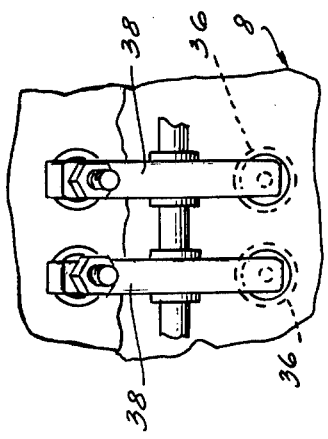
FIG. 5 is an end elevational view of a portion of one cylinder of the structure illustrated in FIG. 4.

The washed gases are than supplied to suitable compression means, indicated generally by the numeral 8, which may, for example, be in the form of a positive displacement, piston-type structure such as illustrated in FIGS. 4 and 5, operative to place the washed fluid discharge under pressure, preferably from 20 to 40 psi. It has been found that a presure of 30 psi will produce very good results. Following compression of the fluid discharge it is conducted through an outlet conduit 9 to intermixing means which, in the embodiment illustrated, comprises a jet structure, indicated generally by the numeral 10, and a pump 11, for example of the vane type. The jet structure 10 is adapted to be supplied with water through a supply pipe 12 under pressure derived from a pump 13, with the water being obtained from a suitable source as hereinafter described.

Referring to FIG. 3, which illustrates the jet structure 10 in greater detail, the conduit 9 for the fluid discharge terminates in an open end 14 disposed within the structure 10 and encircled by a water jacket 15 which is concentric therewith and is supplied with water from the pump 13 through the conduit 12. As illustrated in FIG. 3, the water jacket 15 is provided with a converging, conical shaped wall 16, which forms a restricted, annular shaped water discharge port 17 encircling the adjacent end of the conduit 9. The smaller end of the section 16 is connected with the inlet of the pump 11 over a conduit 18 which thus is common to both the fluid disharge and the water.

It will be noted that the jet structure thus formed concentrates and directs the water flow at the end of the conduit 9 in converging directions intersecting the discharge flow and results in a thorough and intimate mixing action between the water and fluid discharge. The intermixing action is further enhanced by the pump 11 which, preferably is of a vane type, creating further agitation and intermixing between the fluid discharge and its contents, and the water. The pump 11 preferably is so operated that it eliminates the build-up of a pressure head at the inlet of the pump and therefore at the intermixing site.

The thoroughly and intimately mixed fluid discharge and water is then conducted from the outlet of the pump 11 over a conduit 19 to expansion and separating means 20, illustrated as comprising an expansion chamber through which the conduit 19 extends and is closed at its inner end by the adjacent wall of the structure. The conduit 19 is provided with a discharge opening 21 in the bottom portion thereof through which the fluid discharge-water mixture is expelled into the receptacle, with the water dropping downwardly under the action of gravity and discharged therefrom through a discharge spout 22. The upper portion of the structure 20 is provided with an exhaust conduit 23 for the exhausting of the treated discharge.

If the treated fluid discharge is to be subjected to further material removal, the equipment for such removal would be disposed to receive the fluid discharge exhausted through the conduit 23.

FIG. 2 also illustrates means for reconditioning the water utilized in the operation, which means is illustrated, merely for exemplary purposes, as a filter structure indicated generally by the numeral 24, illustrated as having a filter-bed 25 of suitable material and an effluent chamber 26 therebelow. As previously mentioned, water discharged from the expansion and separation means 20 may be discharged over the spout 22 into the filter structure above the filter bed 25 and in like manner the water removed from the spray wash and separating structure 1 may be discharged over a spout 27 into the filter 24.

The filter 24 could be of any suitable construction, employing any suitable filter medium in accordance with known techniques and may, for example, be of a continuous type wherein the filter medium is disposed on a moving carrier and is constantly being cleaned and reused, or, as illustrated, two filters may be employed, the filter 28, for example, being of the same construction as the filter 24 and alternately operated, whereby one filter may be cleaned while the other one is in use. The effluent from the filters may be conducted through suitable piping 29 to dissolved material recovery means 28a and the remaining effluent therefrom is delivered to the pump 7 for supply to the spray wash structure 2. In like manner the inlet of the pump 13 may be supplied with water over a conduit 30 from either of the filter structures. It will be apparent that by the use of suitable valving the pumps 7 and 13 may be supplied with water from either of the filter structures 24, 28. Where the filter structures are utilized alternately, the spout 22, 27 may be arranged to permit selective discharge into either of the filter structure as indicated by the dotted lines.

The Compression Means

While any suitable means may be employed for placing the fluid discharge under pressure, it will be appreciated that such means must be so constructed that it will withstand any contaminants carried by the fluid discharge as well as any particulate material remaining in such discharge, and as this structure forms substantially the heart of the system and its effectiveness, it should be positive in action, insuring that all of the fluid discharge will be accommodated without a reduction in the normal flow of fluid discharge to the structure. It is believed that such structure should be of the positive displacement type, capable of placing the fluid discharge under the desired pressures.

Referring to FIGS. 4 and 5, which illustrate a structure of opposed type, using rocker arm valve actuation, the structure is provided with a plurality of cylinder bores 31, in which are reciprocably carried pistons 32 adapted to be connected to a crank shaft 33 through eccentrics 34, and connecting rods 35, with the crankshaft 33 being rotated by a suitable power source not illustrated. Each cylinder is provided with a pair of poppet valves 36, normally maintained in closed position by valve springs 37 and adapted to be actuated by rocker arms 38 pivotally supported by a fixed portion of the device, which in turn are adapted to be moved to valve-opening position by push rods 39 adaped to be reciprocated by respective cams 40 carried by a crankshaft 41, which is illustrated as being driven by the crankshaft 33 over gears 42, 43, illustrated as having a 1:1 ratio. With proper design of the respective cams 40, each cam may be employed to operate two valves, one from each of two opposed cylinders with one such valve representing the intake valve and the other the exhaust valve. Thus, the exhaust valve of the one cylinder will be open during an intake stroke while the corresponding valve of the other cylinder will be open through an exhaust stroke. During the subsequent half revolution of the crankshaft 33 the other two valves will be correspondingly opened or closed. The size and number of cylinders will, of course, depend upon the volume of fluid discharge which is flowing, whereby the compression means is adequate to provide the desired compression without impeding normal flow.

As previously mentioned, the design should be such that the requisite volume can be handled while providing the desired output pressure of the fluid discharge.

Operational Results

The present invention has proved to be very effective in the treatment of fluid discharges, particularly those involving combustion products and the like. For example, a report of an independent laboratory of its testing of the invention is as follows, with the results being quoted verbatim from the report:

"During the testing, Western Indiana 3–4% sulfur coal from Old Ben Mine #1 was being burned in a stoker-fed coal furnace. The construction of the burner/cleaner combination is such that no air enters the system except as it is pulled in through the furnace by the cleaning system. No air leaves the system except through the cleaner. In other words, there is no dilution of the furnace air (except by the pickup of water vapor) between the fire and the exit duct. The air that was tested at the exit duct is therefore quite representative of the furnace output."

"The following tests were run.

*Particulate Matter* A paper thimble in a steel holder designed for isokinetic stack sampling was used to collect particulates. No efforts were made to obtain isokinetic conditions. Effluent as was drawn through the filter at a rate of 0.8 cfm for a period of 69 minutes. A value of 0.13 milligrams of particulate matter per cubic meter of air was obtained. This is in accord with the visual observation that nothing but an occasional wisp of what appears to be a fine water spray was visible exiting from the duct and that the inside of the duct appears clean.

*Sulfur Dioxide* Two tests were run according to the NIOSH method Number P&CAM 146. Sampling periods were 36 minutes and 30 minutes with impinged ratios of 1.7 and 1.4 liters per milliliter of test solution respectively. The values obtained for Sulfur Dioxide concentration were 1.17 ppm and 0.17 ppm respectively. Sulfur Dioxide was also checked with a hand pump/colorimetric ampoule system which gave values of 4 ppm during the early part of the testing and 1 ppm or less during the later part. The NIOSH method should be given most consideration since it is an integrated sample rather than a grab sample.

*Carbon Monoxide* Two readings were taken during the testing, using the hand pump system. Results of 800 ppm and 600 ppm were obtained.

*Carbon Dioxide* Again using the hand pump, a single test gave a value of 2.0%.

*Other Gases* The hand pump was also used to test for Nitrogen Dioxide (1 ppm and 3 ppm); Hydrogen Sulfide (none detected—less than 1 ppm) and Mercaptans (none detected—less than 1 ppm).

"In summary, the effluent from the coal burner is low in all the substances tested for with the exception of Carbon Monoxide which would not be expected to be removed by a water system without a specific adsorbent."

It should be noted that the carbon monoxide tests were conducted in a room in which a gasoline engine was running and as a result of which it would appear was responsible for the above test readings thereof. In another test by the City of Zion, Illinois, in which the test instrument was placed directly in the fluid discharge exhaust, it was stated that no intolerable amounts of carbon monoxide were detected.

It will be appreciated from the above that the invention provides exceptionally good removal of contaminants from the smoke of combustion, eliminating substantially all particulates within the fluid discharged, as well as effectively reducing sulphur content, etc. At the same time, it will be appreciated that the system is relatively simple requiring no complicated or exotic equipment and which may be readily designed for substantially any installation, in dependence upon requirements thereof.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. A device for the treatment of gaseous fluid containing particulates, comprising means forming a spray chamber having an inlet and an outlet for the fluid to be treated, and including water spray means through which such fluid is to be passed for at least partially removing particulates therefrom, means for receiving washed fluid discharged from said spray chamber and removing entrained water therefrom, power-driven compression means for receiving washed fluid from said entrained water-removing means and placing such fluid under pressure, means for receiving washed fluid under pressure from said compression means and water under pressure, and intermixing the same, and means for receiving intermixed washed fluid and water from said intermixing means for separating water from such intermixture.

2. A device according to claim 1, comprising in further combination, filter means for receiving water, from said entrained water removing means, and from said separating means, for removing particulate materials therefrom.

3. A device according to claim 2, comprising in further combination, means for removing dissolved materials from the water from said filter means.

4. A device according to claim 1, wherein said intermixing means has a common inlet structure for pressurized washed fluid and the water to be intermixed therewith, which inlet structure has concentric openings for the entrance of said water and said washed fluid.

5. A device according to claim 4, wherein the opening for said washed fluid is the central opening and that for the water is annular and encircles the central opening.

6. A device according to claim 5, wherein said annular opening is so arranged that water is directed toward the axis of said central opening for effecting a thorough intimate intermixing of the water and washed fluid entering the intermixing means.

7. A device according to claim 6, wherein said intermixing means includes a pump disposed to receive water and washed fluid following initial mixing of the water and washed fluid.

8. A device according to claim 7, wherein said pump comprises a rotary vane pump.

9. A device according to claim 1, wherein said compression means comprises a positive displacement pump.

10. A method of treating gaseous fluid containing particulants, comprising the steps of passing such gaseous fluid through a water wash spray, separating the water and accumulations therein from the washed fluid remaining after said separation, compressing said remaining fluid to a pressure of between 20 and 40 pounds, thereafter intermixing the latter under pressure with water, separating the intermixed fluid from the water, and exhausting said separated fluid discharge.

11. A method according to claim 10, comprising in further combination the step of removing any particulate material from the remaining water, and remaining dissolved materials from the remaining effluent.

12. A method according to claim 11, comprising utilizing said effluent, remaining after removal of dissolved materials, as said water spray.

13. A method according to claim 11, comprising utilizing said effluent, remaining after removal of dissolved materials, as the water for said intermixing with the pressurized discharge.

14. A method according to claim 11, comprising utilizing said effluent, remaining after removal of dissolved materials, as the water supply for said water spray and for said intermixing with the pressurized dicharge.

15. A method according to claim 10, wherein the washed discharge is compressed to a pressure of approximately 30 psi.

16. A method according to claim 10, wherein said water and pressurized washed discharge, are intermixed with a jet action in which the discharge is centrally expelled and the water is directed into the expelled discharge as a concentric jet.

* * * * *